UNITED STATES PATENT OFFICE.

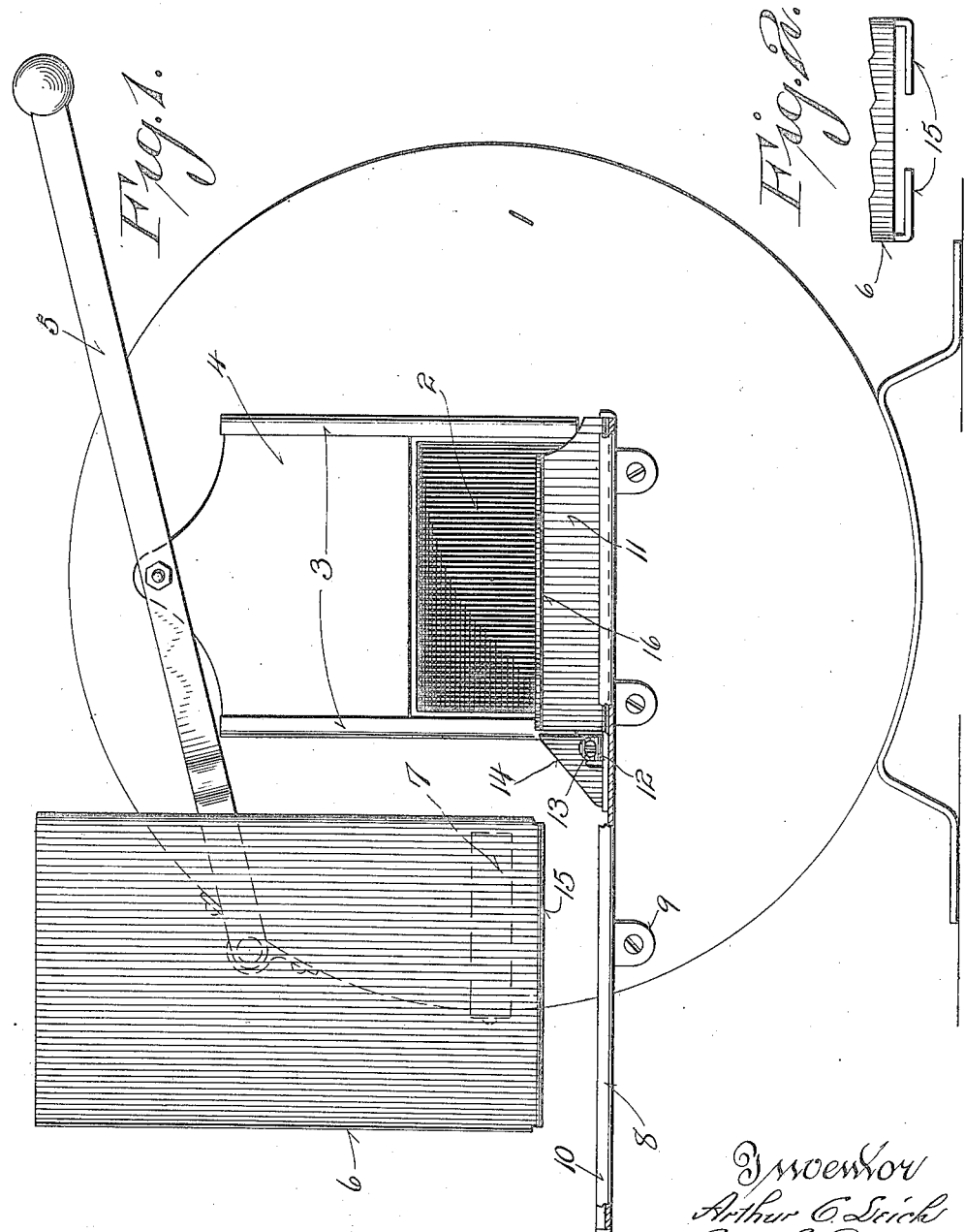

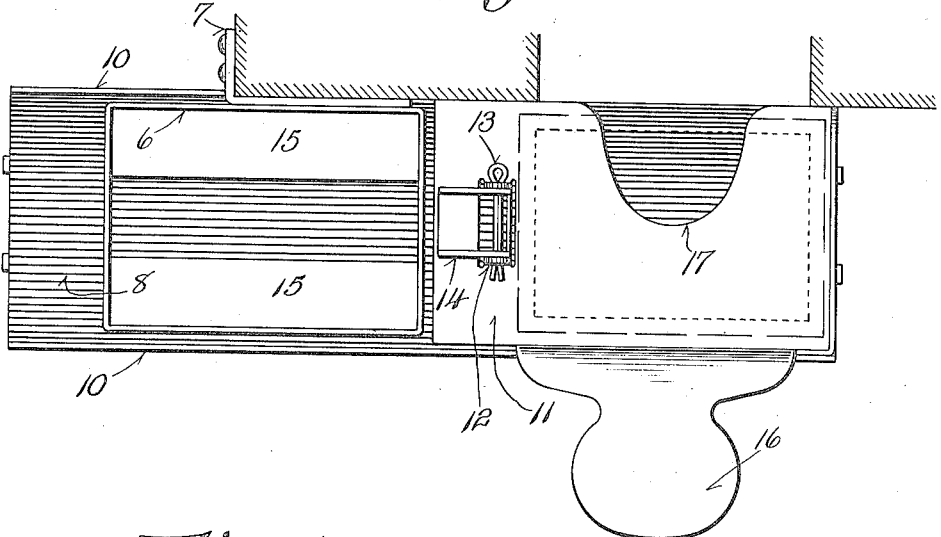
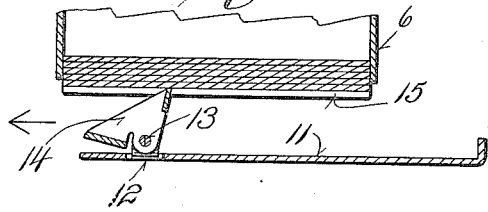
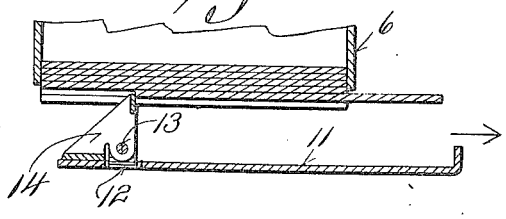
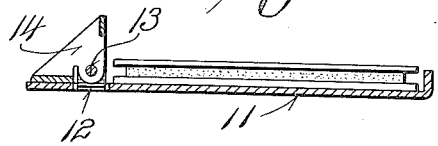

ARTHUR C. LEICH AND JESSE S. BERNER, OF MILWAUKEE, WISCONSIN.

TRAY FOR FORMING AND SERVING SANDWICHES.

1,293,482.     Specification of Letters Patent.     Patented Feb. 4, 1919.

Application filed June 11, 1918. Serial No. 239,386.

*To all whom it may concern:*

Be it known that we, ARTHUR C. LEICH and JESSE S. BERNER, citizens of the United States, and residents of Milwaukee, in the county of Milwaukee and State of Wisconsin, have invented certain new and useful Improvements in Trays for Forming and Serving Sandwiches; and we do hereby declare that the following is a full, clear, and exact description thereof.

This invention refers to trays for forming and serving ice cream sandwiches. The present custom is to use machines for slicing a brick of ice cream at the same time supplying the necessary biscuits to the slices to form sandwiches and serving them to the consumer by hand. This results in a considerable loss of time and is objectionable from a sanitary view point.

In view of this the main object of our invention is to provide a tray which upon movement back and forth will receive the necessary biscuits and slice of ice cream to form a sandwich.

A further object is to provide a tray which is detachable from the main machine and which will allow the sandwich formed thereon to be grasped from the top and bottom on presentation to the consumer, thus rendering it unnecessary for the operator to touch the same.

The invention in one practical form in which it may be embodied is illustrated in the accompanying drawings, in which:

Figure 1 is a front elevational view of an ice cream sandwich machine embodying our invention.

Fig. 2 is a view showing a fragment of a biscuit supply chamber.

Fig. 3 is a plan view of our invention, and

Figs. 4, 5 and 6 are diagrammatic views showing the successive steps in forming a sandwich.

In the drawings 1 designates the horizontally disposed jacket of an ice cream sandwich machine which is provided with a passage 2 therethrough adapted to contain the ice cream and which has adjacent its sides guideways 3 for the reception of the reciprocating knife 4, pivotally connected to the top of which is an operating lever 5.

Secured to the front of the jacket 1 by the bracket 7 is a vertical biscuit supply chamber 6. Positioned directly below the biscuit supply chamber is a support 8 secured to the jacket by ears 9 and having at its outer edges up-turned flanges 10 for the purpose of guiding the tray 11 which is slidably mounted thereon. Adjacent one edge of the tray 11 are up-turned ears 12 that carry a pin 13 on which is mounted a dog 14. Upon reciprocation of the tray the dog 14 passes under the biscuit supply chamber and between laterally turned flanges 15, provided at the bottom of the supply chamber, for retaining the biscuits.

It will be seen from the foregoing description that upon movement of the tray in one direction by the use of the handle 16 the hinged dog 14 will ride under the biscuits as shown in Fig. 4 and upon movement in the other direction as shown in Fig. 5 will select the lower biscuit feeding the same off of the flanges 15 and allowing it to drop upon the tray. At the extreme end of the movement in this direction the tray with its necessary biscuit will be in position before the ice cream passage 2 and upon operation of the knife 4 a portion of ice cream will be sliced off and permitted to fall upon the biscuit. The operation is then repeated and another biscuit is disposed over the slice of ice cream thus forming a completed sandwich.

Centrally of the tray 11 is a cut out portion 17 which upon removing the tray from the support and presenting the same to the consumer will allow him to readily grip the sandwich from the top and bottom, thereby rendering it unnecessary for the operator to touch the same with his hands.

While I have shown and described our invention in connection with an ice cream sandwich machine it is obvious that the same might be used in connection with other machines such as meat slicers and so forth without departing from the invention.

What is claimed is:

1. A sandwich forming device including a biscuit supply magazine, a source of filler supply, a support extending between the discharge mouth of the biscuit magazine and the source of filler supply, a tray slidable on the support and removable therefrom, means for feeding biscuits from the biscuit magazine on to the tray, and a handle on the tray whereby it may be slid on the support and whereby it may be removed from the support.

2. A sandwich forming device including a filler supply means including a horizontally extending container, means at the discharge mouth thereof for cutting filler material, a tray support disposed under the discharge mouth of the filler container, a vertical biscuit magazine disposed over the support at one side of the discharge mouth of the filler container and having its bottom spaced from the support, a tray reciprocable on said support from a position under the magazine to a position under the discharge mouth of the filler container, and a pivoted dog movable with the tray and engageable successively with biscuits in the magazine for feeding them on to the tray upon movement of the tray away from the magazine.

3. A sandwich forming device including a filler supply means including a horizontally extending container, means at the discharge mouth thereof for cutting filler material, a tray support disposed under the discharge mouth of the filler container, a vertical biscuit magazine disposed over the support at one side of the discharge mouth of the filler container and having its bottom spaced from the support, a tray reciprocable on said support from a position under the magazine to a position under the discharge mouth of the filler container, means for feeding biscuits from the magazine on to the tray, said tray being manually removable from the support.

In testimony that we claim the foregoing we have hereunto set our hands at Milwaukee, in the county of Milwaukee and State of Wisconsin.

ARTHUR C. LEICH.
JESSE S. BERNER.